July 26, 1955  H. J. FRAMHEIN  2,713,918
WHEEL MOUNTING FOR INDUSTRIAL TRUCK
Filed May 16, 1952  4 Sheets-Sheet 1
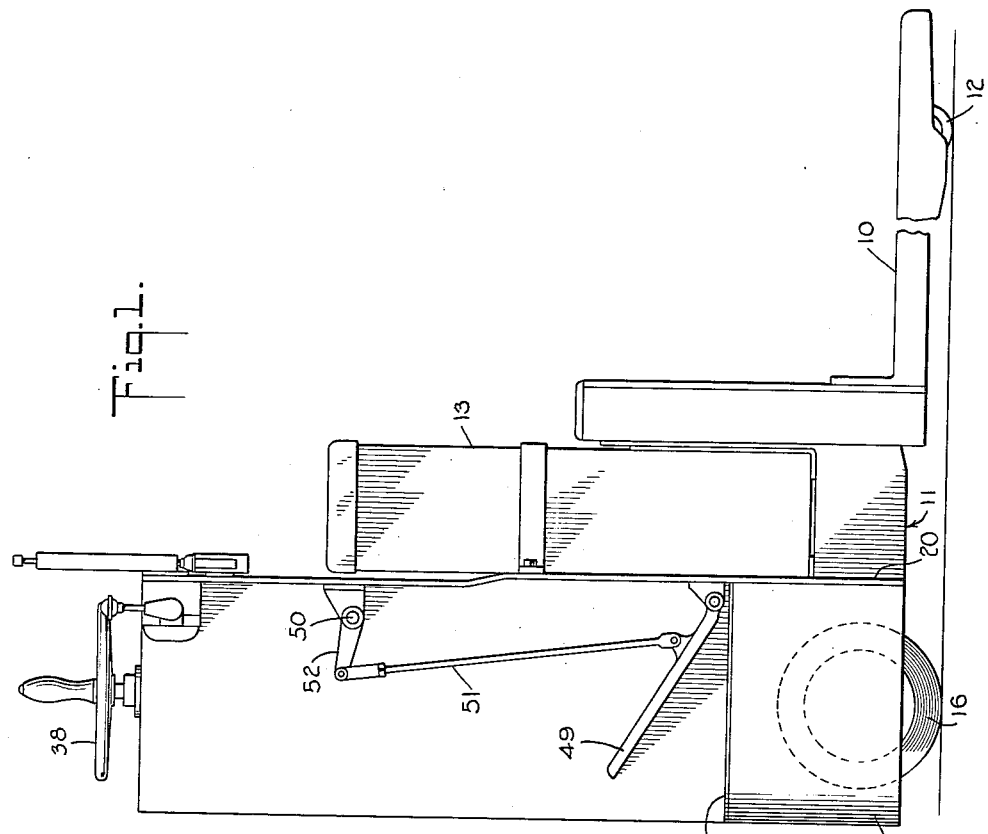
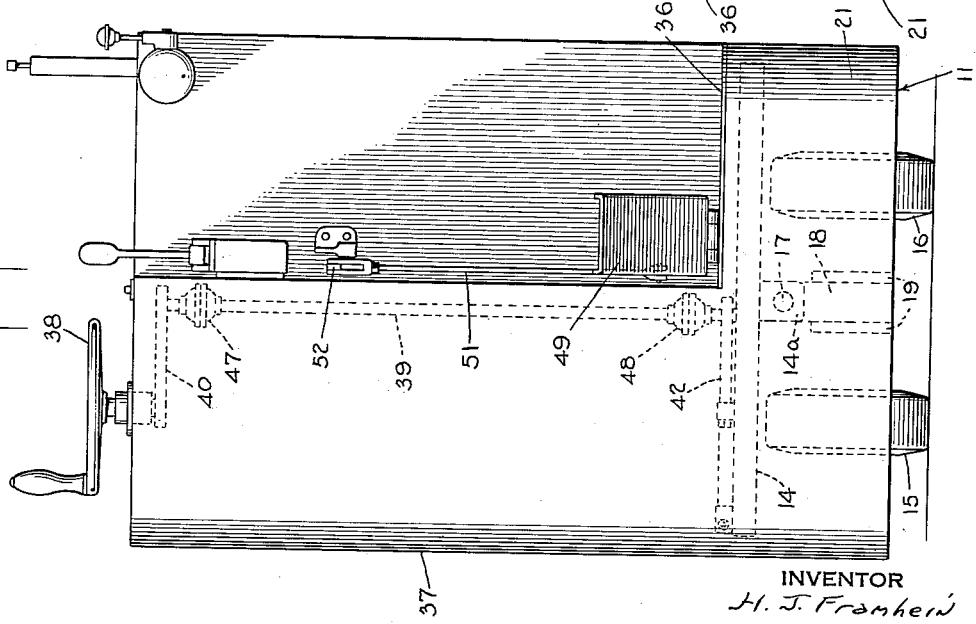
INVENTOR
H. J. Framhein
BY
H. H. Golden
ATTORNEY

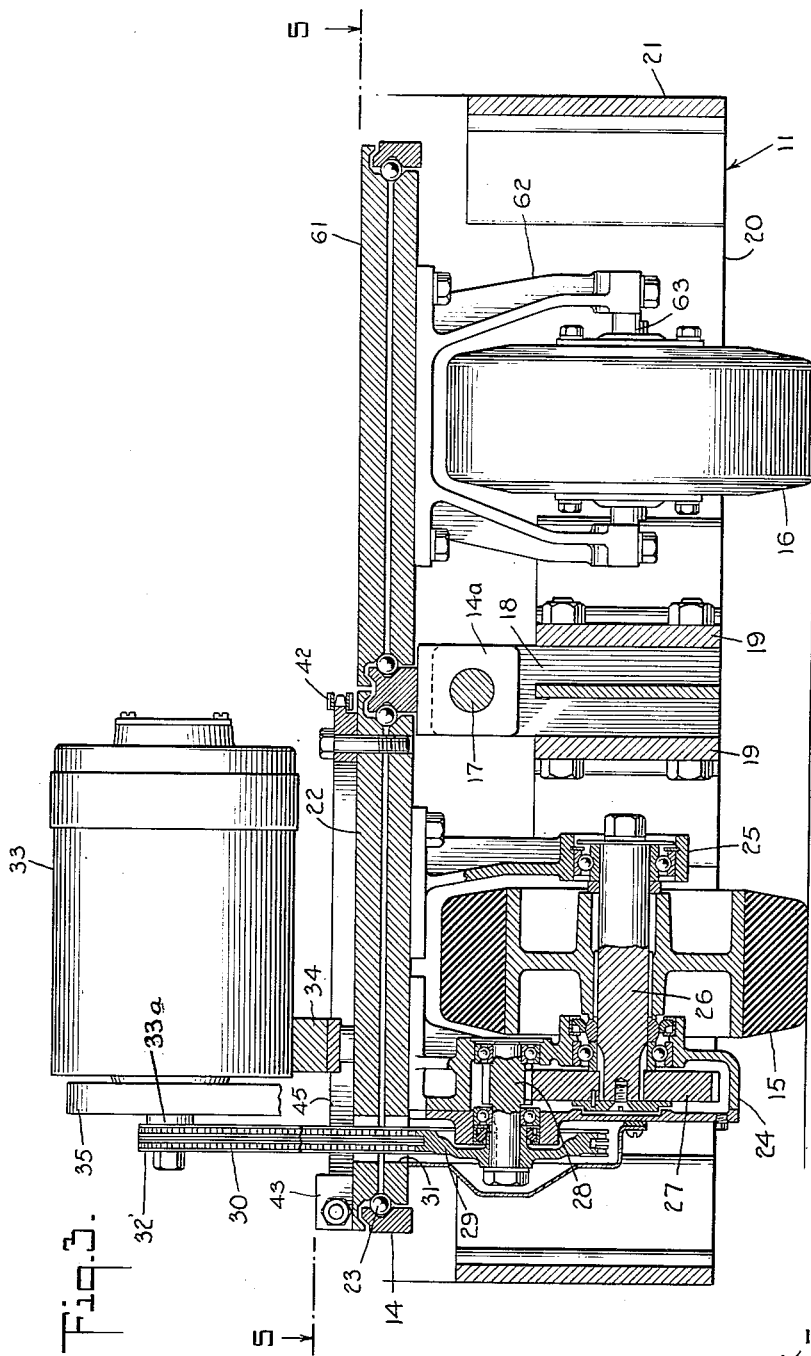

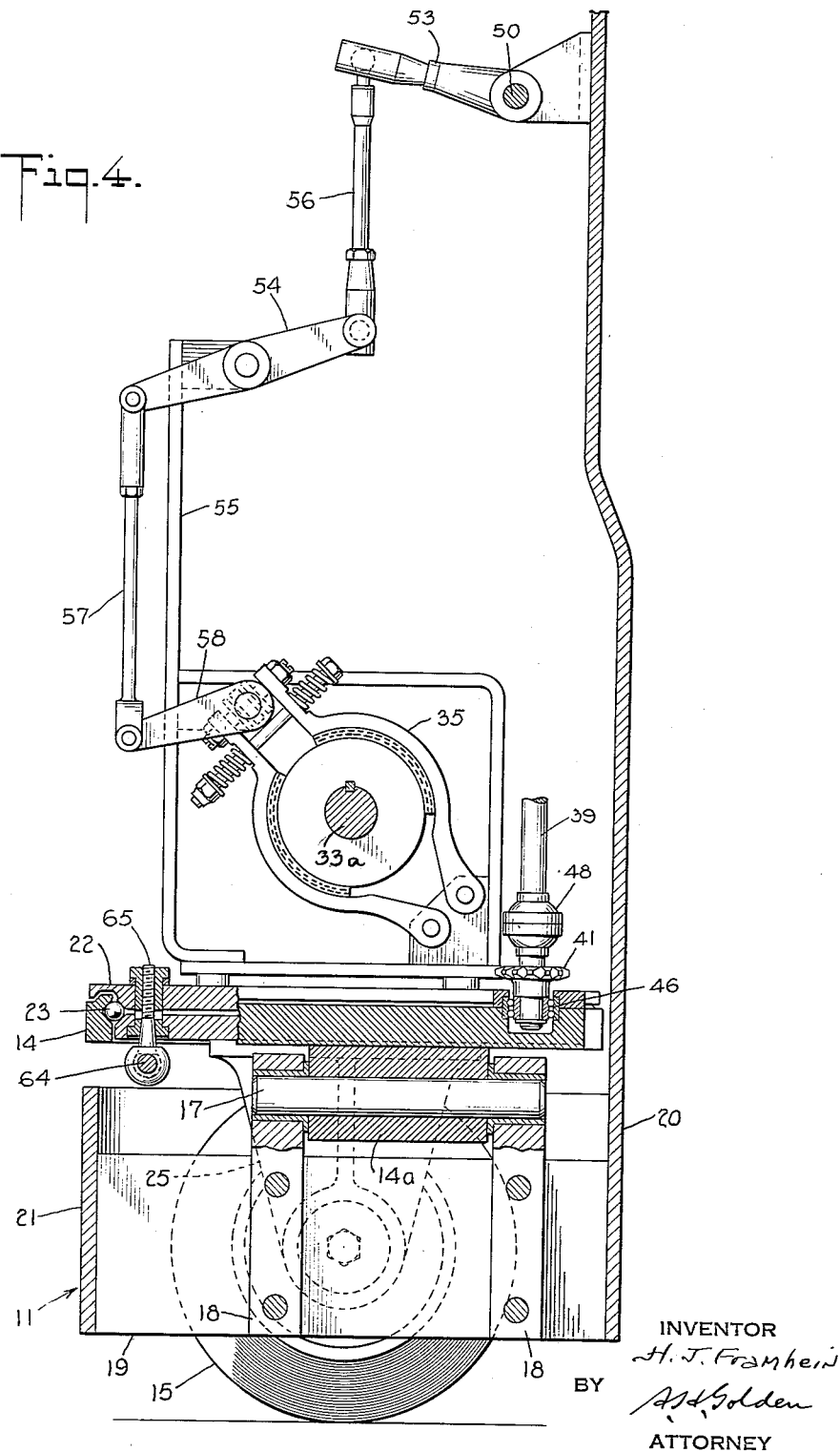

July 26, 1955  H. J. FRAMHEIN  2,713,918
WHEEL MOUNTING FOR INDUSTRIAL TRUCK
Filed May 16, 1952  4 Sheets-Sheet 4
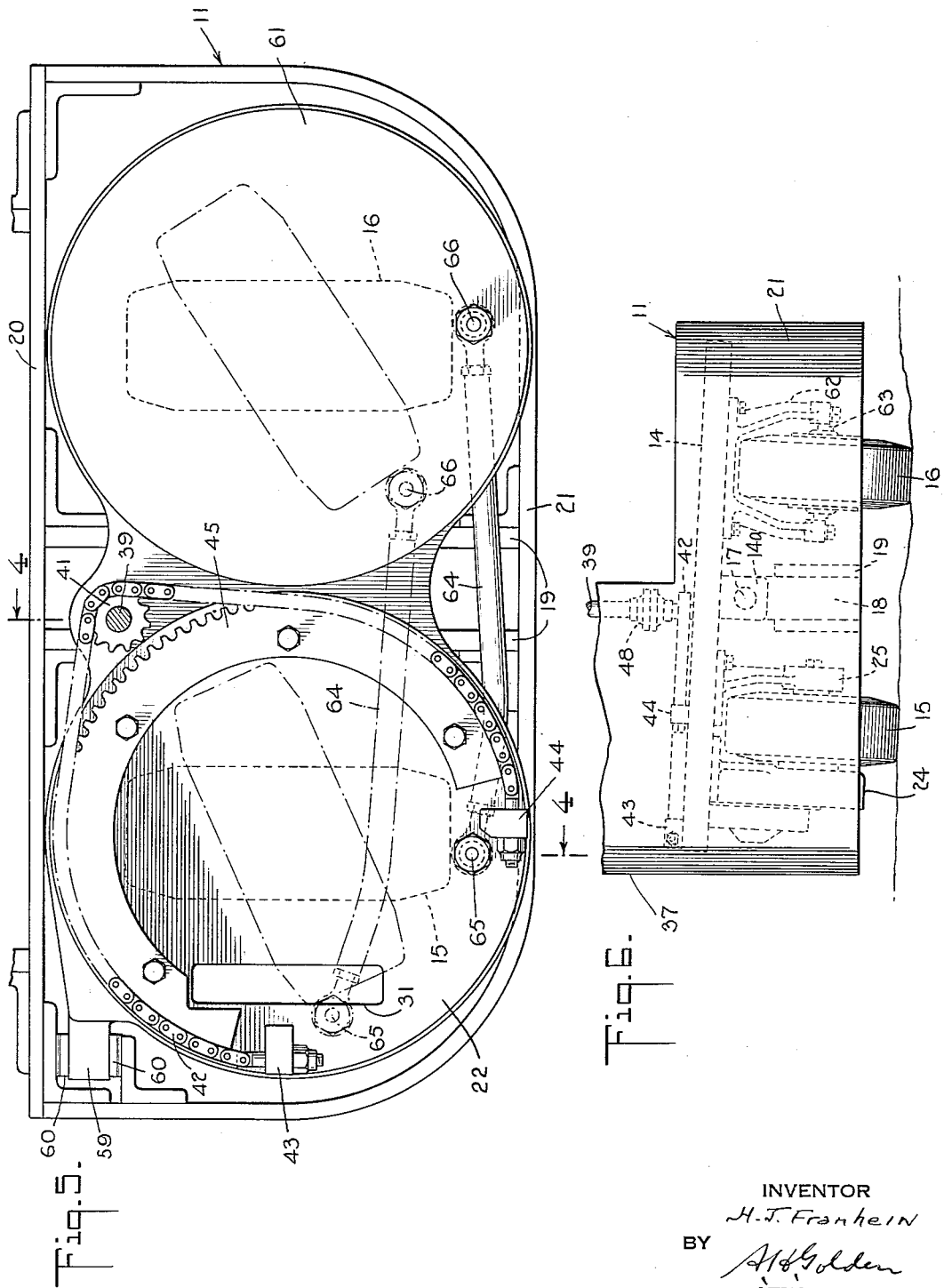
INVENTOR
H. J. Framhein
BY A. H. Golden
ATTORNEY

United States Patent Office 2,713,918
Patented July 26, 1955

2,713,918

WHEEL MOUNTING FOR INDUSTRIAL TRUCK

Herbert J. Framhein, Chicago, Ill., assignor to The Yale & Towne Manufacturing Company, Stamford, Conn., a corporation of Connecticut Application May 16, 1952, Serial No. 288,243

3 Claims. (Cl. 180—52)

This invention relates to an industrial truck, and more particularly to that type of industrial truck illustrated in my Patent No. 2,519,128, issued August 15, 1950. It is important that trucks of the particular class steer very sharply in order to permit the use thereof in narrow aisles such as are found in industrial plants and warehouses. In the truck of my patent a very short turning radius is possible through the mere turning of the combination traction and steering wheel. However, it has been found that trucks of the particular class lack the stability of a four wheel truck in which the load platform is naturally supported at four points, or even of a three wheel truck where two of the wheels are arranged along one longitudinal axis and the third wheel on a laterally spaced axis.

The problem is further complicated, naturally, where the truck is of the pallet lifting type in which a very low platform is adapted to enter between the upper and lower floors of a conventional industrial pallet. Naturally, pallet trucks must have a lifting wheel under each side of one end of the lifting platform, these wheels being adapted to enter the pallet.

In order to solve the problem, it has been proposed that a truck of the particular class have four wheels, two being the load supporting wheels under the lifting platform, while the other two wheels are carried by the forward end of the truck or that end of the truck on which the operator may wish to stand. More particularly, it has been proposed that one of the wheels at the forward end of the truck be a caster wheel carried by the frame of the truck, and that the other wheel be a combined steering and traction wheel.

It has been maintained that a truck so constructed will have the stability of a four wheel truck, while yet being just as maneuverable as the three wheel truck illustrated in my earlier patent. However, it has been found in a truck of the particular type that it is necessary to compensate for irregularities in the floor by providing a spring between the caster wheel and the frame of the truck to permit some vertical movement of the caster wheel relatively to the truck. On poor flooring it will be appreciated that the traction of the combined steering and traction wheel will vary constantly as the caster wheel moves to take up irregularities. Of course, under certain conditions the caster wheel will be unable to take up these irregularities and the frame will naturally distort, while frequently the weight on the traction wheel will be reduced to a point where traction and braking are not very effective.

Further, any wear on the traction wheel, and this will be rather considerable where the traction wheel carries a rubber tire, must be compensated for by vertical adjustment. Otherwise, there will be further distortion of the frame of the truck, while the spring action of the caster will become increasingly more effective as the wearing of the traction wheel tire increases.

In addition, in a truck of the particular class having a traction and caster wheel combination, should the combined traction steering wheel be turned to a sharp angle with the caster wheel not aligned in the direction of movement of the truck at that angle, there will be a tendency to shear the tire off the caster wheel. Actually, if the caster wheel is at right angles to the direction of movement of the truck as determined by the combined steering and traction wheel, it is possible to destroy the caster wheel and its tire.

The particular problem thus presented to the prior art is rather considerable, and many solutions have been attempted over a period of years. I do believe that the contribution set forth in this application is one that solves this long-standing problem. Thus, I utilize a four wheel truck having the usual small load wheels, although these load wheels may be large where the truck is not to be used for the lifting of pallets. In addition, my truck carries at its forward end a pair of wheels, one at each end of a beam pivoted centrally of the truck. One of the wheels is preferably a combined steering and traction wheel of the type shown in my earlier Patent No. 2,519,128. The other wheel is preferably also adapted to be rotated on a steering axis. By rotating the combined steering and traction wheel and the opposed wheel together on axes that preferably are vertical and traverse centrally each of the wheels, my truck can be steered at extremely sharp angles in exactly the same manner as in my earlier patent.

In addition, my truck is well supported on all types of flooring without distortion of the frame, while the tractive effort remains the same at all times due to the equalizing action of the beam carrying the two wheels. Further, it is not necessary to adjust the traction unit and its steering and traction wheel to compensate for tire wear, because of the inherent construction of the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing, Fig. 1 is a side view of a pallet truck that embodies my invention in a preferred form. Fig. 2 is an end view of the truck shown in Fig. 1. Fig. 3 is a transverse sectional view showing the relationship of the beam to the frame of the truck. Fig. 4 is a vertical section taken on the line 4—4 of Fig. 5. Fig. 5 is a plan view taken approximately on the line 5—5 of Fig. 3, and indicating also the relationship of the wheels as they are turned for steering the truck. Fig 6 is an end view similar to a part of Fig. 2, but indicating the rocking action of the beam in passing over irregular ground.

In the pallet truck that I have chosen to illustrate for the purpose of describing my invention, a load platform 10 is supported at its forward end upon the main frame 11 of the truck and at its rear end upon wheels 12, this being a customary arrangement in the particular type of truck. Also, as a source of power for the truck, a battery 13 is supported on the main frame 11 ahead of the platform 10, and the steering and driving means for the truck are mounted on the frame forwardly of the battery 13. In the prior art, the front supporting wheels and the driving and steering means have taken various forms, but none of these have offered in the combination the advantages that are inherent in my novel construction now to be described.

In my invention, I utilize a transverse beam 14 through which a traction wheel 15 and an idler wheel 16 adjacent opposed sides of the truck support the front end of the truck, and through which these wheels have a compensating movement that affords very efficient action of the steering and driving means. This beam 14 is mounted to rock about the longitudinal axis of the truck, and for this purpose I provide a pivot pin 17 that is best seen in Figs. 3 and 4. The pivot pin 17 is mounted upon the frame 11 of the truck, and in the particular example illustrated the ends of the pin 17 are rotatably held in a pair of vertical brackets 18 mounted between a pair of frame members 19 that form a part of the main frame of the truck. The pivot pin 17 is secured in a lug 14a located centrally on the underside of the beam 14, this lug extending between the frame brackets 18 so as to prevent substantial end play of the beam relatively to the truck. Preferably, the truck frame includes a transverse vertical member 20 and a U-shaped end member 21 between which the wheels 15, 16 are located, and to which the frame members 19 are assembled in a longitudinal position between the wheels 15 and 16.

The traction wheel 15 is a part of a steering and traction unit that rocks integrally with the transverse beam 14, and that also rotates on a vertical axis relatively to the beam for steering the truck. Preferably, the steering and traction unit is mounted through a turn table 22 that rotates on ball bearings 23 in an opening in one end portion of the beam 14. The traction wheel 15 is mounted beneath the turn table 22 by a pair of brackets 24, 25 in which rotate the ends of the drive shaft 26 upon which the traction wheel 15 is fixed. The arrangement is such that the wheel 15 is centered relatively to the turn table 22, so that when the turn table rotates the wheel pivots about its own central vertical axis. The bracket 24, best seen in Fig. 3, is formed to provide a gear casing that encloses a gear 27 fixed upon the shaft 26 and a driving pinion 28 meshed with the gear 27. The shaft of the pinion 28 has fixed upon it a sprocket 29, and trained over this sprocket is a pair of drive chains 30 that extend upwardly through an opening 31 in the turn table 22 and around sprocket 32 on the shaft 33a of the driving motor 33 that is mounted upon the upper side of the turn table, as by a bracket 34. The usual brake 35 is provided upon the shaft of the driving motor 33, as may be seen in Figs. 3 and 4.

It will be observed at this point that the steering and driving unit, because of its position adjacent one side of the truck, offers no obstruction to the driver's platform 36 that is mounted on the frame at the opposed side of the truck, as is shown in Figs. 1 and 2. Around and above the steering and driving unit I provide an enclosure 37 on the truck frame, and on the top of this enclosure is a steering wheel 38. I prefer to transmit steering rotation from the wheel 38 to the turn table 22 through a vertical shaft 39 within the enclosure 37, as shown in Fig. 2. The steering wheel 38 rotates the steering shaft 39 at its upper end through a chain 40, and at its lower end the shaft 39 has a sprocket 41 engaged with a chain 42 that may be seen in Fig. 5. Opposed ends of the chain 42 are connected to anchor blocks 43 and 44 mounted upon outer edge portions of the turn table 22, and a sprocket sector 45 fixed upon the turn table maintains uniform the action of the chain as it rotates the turn table. As the transverse beam 14 rocks upon the pivot pin 17 relatively to the enclosure 37, the sprocket 41 is maintained in its proper operating alignment by a bearing 46, seen in Fig. 4, through which the lower end of the steering shaft 39 is mounted in the transverse beam 14. The steering shaft 39 has been referred to as a unitary shaft for purposes of description, but actually upper and lower universal joints 47, 48, shown in Figs. 2 and 4, are interposed in this shaft so that the shaft will accommodate itself to the rocking of the beam 14.

I have shown, in Figs. 1, 2, and 4, a linkage through which the brake 35 is actuated by a pedal 49 mounted on the relatively stationary part of the truck. The pedal 49 rotates a shaft 50 on an upper portion of the frame member 20 through a link 51 and a lever 52. Within the enclosure 37, an arm 53 is fixed on the shaft 50. The arm 53 moves a lever 54 that is mounted upon the rocking transverse beam 14 through a bracket 55, this movement of the lever 54 being accomplished through a link 56 that is connected to the arm 53 and the lever 54 through ball and socket joints that absorb movement in the linkage resulting from rocking of the beam 14. The lever 54 when moved by the arm 53 actuates the brake 35 through a link 57 and a cam arm 58.

It will be appreciated that the wheel 16, being an idler wheel, does not contribute to the driving and braking of the truck, and therefore the pivot pin 17 is normally required to accept the rather considerable eccentric forces that result from the position of the traction wheel 15 entirely as one side of this pivot pin. The pin 17 is quite capable of accepting these eccentric forces, but I nevertheless prefer to apply the propelling force of the traction unit to the frame of the truck in a more direct manner, and for this purpose I utilize a torque finger 59 integrally mounted on the left hand forward portion of the transverse beam 14, as viewed in Fig. 5. As the beam 14 rocks, the torque finger 59 moves in the space between a pair of vertical wear strips 60 mounted on the frame 11. The torque finger 59 does of course bear against one or the other of the strips 60 depending upon the direction in which the force is applied, and actually the driving force of the traction unit is accepted in a balanced fashion between the wear strips 60 and the pivot pin brackets 18.

The positive steering of the idler wheel 16 is an important part of my invention, and to facilitate this steering action I prefer to utilize for mounting the idler wheel 16 upon the beam 14, a turn table 61 that in its essential respects is a duplicate of the traction unit turn table 22. Of course, because the idler wheel 16 is not driven, I may utilize a simple U-shaped bracket 62 for mounting the shaft 63 of the idler wheel relatively to the turn table 61. The particular arrangement places the turntable 61 below the driver's platform 36 with the idler wheel abreast of the traction wheel 15, and also mounts the idler wheel 16 to rotate on its own central vertical axis, this axis being parallel to the steering axis of the traction wheel 15. Therefore, the normal motion of the truck produces no steering effect upon the idler wheel 16, and in order to steer this wheel simultaneously with the traction wheel 15 I utilize the steering connection shown in Figs. 4 and 5. This connection is in the form of a connecting rod 64 that is attached by pivots 65, 66 at its opposed ends to the traction wheel turn table 22 and to the idler wheel turn table 61. The pivots 65, 66 are angularly displaced a predetermined amount relatively to each other when both of the wheels 15 and 16 are in straight ahead position, as will be understood by those acquainted with the art, so that the wheels in steering the truck will both tend to swing the truck about a common center.

I believe that the operation and the advantages of my novel truck construction will now be understood, but it may be well to summarize briefly the operation of the truck. First, the truck is supported at its rear end by the wheels 12, and at its front end through the beam 14 by the traction wheel 15 and the idler wheel 16. The traction wheel 15 forms a part of a steering and traction unit that is located entirely at one side of the longitudinal axis of the truck and thereby affords an extremely compact arrangement that allows space for the operator's platform 36 at the other side of the truck. When the truck encounters any irregularity in the ground surface, the beam 14 tilts about the pivot pin 17, and through this action the idler wheel 16 maintains the traction wheel 15 in full tractive engagement with the ground. Of course, the action of the beam 14 prevents a tendency to distort the frame of the truck when the front wheels 15 and 16 move out of the plane of the rear wheels 12. In steering the truck, the traction wheel 15 and the idler wheel 16 are both positively rotated about their vertical axes, and in so rotating the wheels are capable of extreme deflection so that the truck can be turned on a very short radius. Because of the particular arrangement, there is no tendency in steering for the idler wheel 16 to drag laterally or to interfere otherwise with the movement of the truck.

I now claim:

1. In a truck of the class described, a truck frame, a pair of wheels for supporting one end of said truck frame, a beam, means pivoting said beam to the other end of said truck frame centrally of said beam and in the longitudinal axis of the truck to support the other end of said truck frame, a steering and traction unit comprising a traction wheel together with a motor and means extending between said motor and traction wheel whereby said motor rotates said traction wheel, means mounting said steering and traction unit as a unit on one end of said beam adjacent one side of the truck frame for rotation bodily relatively to said beam, said steering and traction unit moving bodily as a unit with said beam as said beam pivots relatively to said truck frame, steering means for rotating said steering and traction unit bodily relatively to said beam, an idler wheel, means mounting said idler wheel on the other end of said beam adjacent to the other side of said truck frame for pivotal movement in an axis parallel to the axis of rotation of said traction unit relatively to said beam in response to steering movement of said steering and traction unit, and said beam moving relatively to said truck frame on its pivot to maintain the tractive effect of said traction wheel when passing over irregular ground.

2. In a truck of the class described, a truck frame, a pair of wheels for supporting one end of said truck frame, a beam, means pivoting said beam to the other end of said truck frame centrally of said beam and in the longitudinal axis of the truck to support the other end of said truck frame, a steering and traction unit comprising a traction wheel together with a motor and means extending between said motor and traction wheel whereby said motor rotates said traction wheel, means mounting said steering and traction unit as a unit on one end of said beam adjacent one side of the truck frame for rotation bodily relatively to said beam, said steering and traction unit moving bodily as a unit with said beam as said beam pivots relatively to said truck frame, an idler wheel, means mounting said idler wheel on the other end of said beam adjacent to the other side of said truck frame for pivotal movement in an axis parallel to the axis of rotation of said traction unit relatively to said beam, steering means for rotating said steering and traction unit bodily relatively to said beam, means connecting said traction unit and said idler wheel for rotating said idler wheel on its axis relatively to said beam in response to steering movement of said steering and traction unit, and said beam moving relatively to said truck frame on its pivot to maintain the tractive effect of said traction wheel when passing over irregular ground.

3. In a truck of the class described, a truck frame, a pair of wheels for supporting one end of said truck frame, a beam, pivot means mounting said beam centrally thereof at the other end of said truck frame and in the longitudinal axis of the truck for pivotal movement relatively to said truck frame, a steering and traction unit comprising a traction wheel together with a motor and means for connection between said motor and traction wheel through which said motor rotates said traction wheel to drive the truck, means mounting the said steering and traction unit as a unitary structure on one end portion of said beam for movement bodily as a unit with said beam as the beam moves on its pivot mounting means and also for rotation as a unit relatively to the beam, steering means for rotating said steering and traction unit bodily on its mounting relatively to said beam, an idler wheel, means mounting the said idler wheel on the other end of said beam for movement bodily with said beam and for steering rotation relatively to said beam on an axis parallel to the axis of rotation of said steering and traction unit relatively to said beam in response to the steering movement of said steering and traction unit, said steering and traction unit and idler wheel by rocking bodily with said beam maintaining the tractive effect of the traction wheel, bearing means on said truck frame, thrust means on a portion of the said beam bearing against said bearing means in all pivoted positions of said beam whereby to transmit at least a part of the driving thrust of the traction wheel to the truck frame.

References Cited in the file of this patent

UNITED STATES PATENTS

| | | |
|---|---|---|
| 1,601,556 | Campbell | Sept. 28, 1926 |
| 2,327,583 | Framhein | Aug. 24, 1943 |
| 2,331,734 | Schroeder | Oct. 12, 1943 |
| 2,564,002 | Gibson | Aug. 14, 1951 |